(12) United States Patent
Svilan et al.

(10) Patent No.: US 9,594,412 B2
(45) Date of Patent: Mar. 14, 2017

(54) CONTROLLING POWER GATE CIRCUITRY BASED ON DYNAMIC CAPACITANCE OF A CIRCUIT

(75) Inventors: Vjekoslav Svilan, Sunnyvale, CA (US); Michael Zelikson, Haifa (IL); Kelvin Kwan, Santa Clara, CA (US); Naveen Neelakantam, Mountain View, CA (US); Norbert Unger, Braunschweig (DE)

(73) Assignee: Intel Corporation, Santa Clara, CA (US)

( * ) Notice: Subject to any disclaimer, the term of this patent is extended or adjusted under 35 U.S.C. 154(b) by 649 days.

(21) Appl. No.: 13/996,285

(22) PCT Filed: Mar. 30, 2012

(86) PCT No.: PCT/US2012/031465
§ 371 (c)(1),
(2), (4) Date: Jun. 20, 2013

(87) PCT Pub. No.: WO2013/147850
PCT Pub. Date: Oct. 3, 2013

(65) Prior Publication Data
US 2013/0275782 A1 Oct. 17, 2013

(51) Int. Cl.
*G06F 1/00* (2006.01)
*G06F 1/26* (2006.01)
*G06F 1/32* (2006.01)

(52) U.S. Cl.
CPC .............. *G06F 1/26* (2013.01); *G06F 1/3203* (2013.01); *G06F 1/3287* (2013.01); *Y02B 60/1217* (2013.01); *Y02B 60/1282* (2013.01)

(58) Field of Classification Search
CPC ........ G06F 1/3203; G06F 1/26; G06F 1/3287; Y02B 60/1217; Y02B 60/1282
See application file for complete search history.

(56) References Cited

U.S. PATENT DOCUMENTS

| 7,737,770 B2 | 6/2010 | Kuhn |
| 7,992,017 B2 | 8/2011 | Safford |

(Continued)

FOREIGN PATENT DOCUMENTS

| CN | 101542442 | | 9/2009 | |
| IN | IN 773/DEL/2011 | * | 3/2011 | ............... G06F 1/32 |

OTHER PUBLICATIONS

International Searching Authority, "Notification of Transmittal of the International Search Report and the Written Opinion of the International Searching Authority," mailed Nov. 29, 2012, in International application No. PCT/US2012/031465.

(Continued)

*Primary Examiner* — Mohammed Rehman
*Assistant Examiner* — Gayathri Sampath
(74) *Attorney, Agent, or Firm* — Trop, Pruner & Hu, P.C.

(57) ABSTRACT

In one embodiment, the present invention includes an apparatus having an estimation logic to estimate a dynamic capacitance of a processor circuit of a processor during a plurality of processor cycles, a power gate calculator to calculate a control value for a power gate circuit coupled to a load line and between a voltage regulator and the processor circuit based on the dynamic capacitance estimate, and a controller to control an impedance of the power gate circuit based on the control value. Other embodiments are described and claimed.

14 Claims, 8 Drawing Sheets

(56) References Cited

U.S. PATENT DOCUMENTS

| | | | |
|---|---|---|---|
| 2005/0015631 A1* | 1/2005 | McDonald | G06F 1/26 713/300 |
| 2005/0024908 A1* | 2/2005 | Gizara | H05K 1/0292 363/147 |
| 2009/0300329 A1* | 12/2009 | Naffziger | G06F 1/3203 712/205 |
| 2010/0077243 A1 | 3/2010 | Wang et al. | |
| 2010/0153761 A1 | 6/2010 | Nishioka | |
| 2011/0018523 A1* | 1/2011 | Priel | G01R 19/0092 324/76.11 |
| 2011/0040995 A1 | 2/2011 | Basak | |
| 2011/0185203 A1* | 7/2011 | Carlson | G06F 1/329 713/320 |
| 2012/0098553 A1* | 4/2012 | Karlsson | G01R 27/2605 324/684 |
| 2012/0254643 A1* | 10/2012 | Fetzer | G06F 1/324 713/320 |
| 2013/0080804 A1 | 3/2013 | Ananthakrishan et al. | |

OTHER PUBLICATIONS

International Patent Application No. PCT/US2011/067334, entitled "Methods and Systems to Control Power Gates During an Active State of a Gated Domain Based on Load Conditions of the Gated Domain," by Michael Zelickson, et al, filed Dec. 27, 2011.
State Intellectual Property Office, People's Republic of China, First Office Action mailed Apr. 14, 2016 in Chinese Patent Application No. 201280072143.2.

\* cited by examiner

CONTROLLING POWER GATE CIRCUITRY BASED ON DYNAMIC CAPACITANCE OF A CIRCUIT

TECHNICAL FIELD

Embodiments relate to power management in an integrated circuit.

BACKGROUND

In various integrated circuits such as processors, workload changes can occur very quickly. As such a dynamic capacitance (Cdyn) also can change quickly, e.g., from very low to very high values in a very few clock cycles. However, a voltage regulator loop, which contains a digital controller and a voltage regulator that provides a regulated voltage to the processor, is much slower to respond and therefore a specified voltage for the device (VID) is set for the worst case current draw, also known as a power virus. Even under the worst case voltage drop, a circuit voltage must not fall below a target value. This circuit voltage is set so that the voltage seen by the circuit is sufficient for error-free operation.

However, setting VID for the worst case current draw implies that in the majority of cases (namely when not running a power virus), the circuit experiences a supply voltage that is greater than required and as such the circuit burns too much power, both as extra leakage and from the extra voltage the circuit switches across.

To aid in power management, an integrated circuit die may include one or more gated power domains for which power may be selectively applied and disrupted, referred to as power gating. Conventionally, power gating is used to intermittently disable or deactivate an entire gated power domain to conserve power when circuitry of the gated power domain is not needed. This may be referred to as placing the gated power domain in a sleep mode or state.

Power gates present an inherent impedance between a power supply and a gated power distribution grid (gated grid). A gated grid voltage may differ from a power supply voltage based on the impedance of the power gates and current consumption of the corresponding gated power domain, in accordance with Ohm's law.

The power supply voltage may be set based on anticipated load conditions. Out of caution, maximum load conditions or maximum current consumption may be assumed. During operation, however, a gated power domain may draw less current from the gated grid than anticipated, and/or the current draw may vary over time. When the gated power domain draws less current than anticipated, the voltage drop over the total load line is less than anticipated. As a result, the gated grid voltage may be higher than a target gated voltage. The higher gated voltage may not necessarily improve performance of the gated power domain, and may decrease power efficiency through increased leakage and/or active power dissipation.

DETAILED DESCRIPTION

In various embodiments, power gate circuitry coupled between a voltage regulator and a circuit of a semiconductor die such as a processor can be controlled to correctly achieve minimal over-voltage and therefore minimize overall power while running non-power virus applications. More specifically, embodiments may provide a dynamic power gating (DPG) system to independently control a plurality of power gates coupled between a voltage regulator and a processor circuit. In one embodiment the system may include a controller and power gates that can be controlled independently under control of the controller.

To control leakage when certain blocks/cores of a processor are inactive, a processor includes power gates to decrease leakage current when the circuit is idling. These power gates may be part of a load line coupled between a voltage regulator and circuitry powered by the voltage regulator and can be adjusted much more rapidly, e.g., on the order of a few clock cycles, than adjusting VID via a control loop of a power control unit (PCU).

In order to control the over-voltage typically occurring for most non-power virus applications, a number of the power gates to be enabled can be controlled. By changing the transistor gate width of the power gates enabled as Cdyn changes, the impedance of the power gates can be controlled, thus absorbing over-voltage in cases when Cdyn drawn by an application is less than the Cdyn of the power virus and therefore current for which VID was calculated. As a result, some portion of the power gates are disabled, even when the circuit is running, to thus bring a gated supply voltage at a device ($V_{cc\_device}$), down to an appropriate level, reducing active and leakage power. In other embodiments, the impedance can be controlled by controlling gate voltage of the power gates appropriately such that all power gates are enabled at a lesser level, and/or mixing biasing and switching portions such that some of the power gates are fully enabled, some fully disabled, and others partially enabled to conduct at a reduced level.

Figure 1:
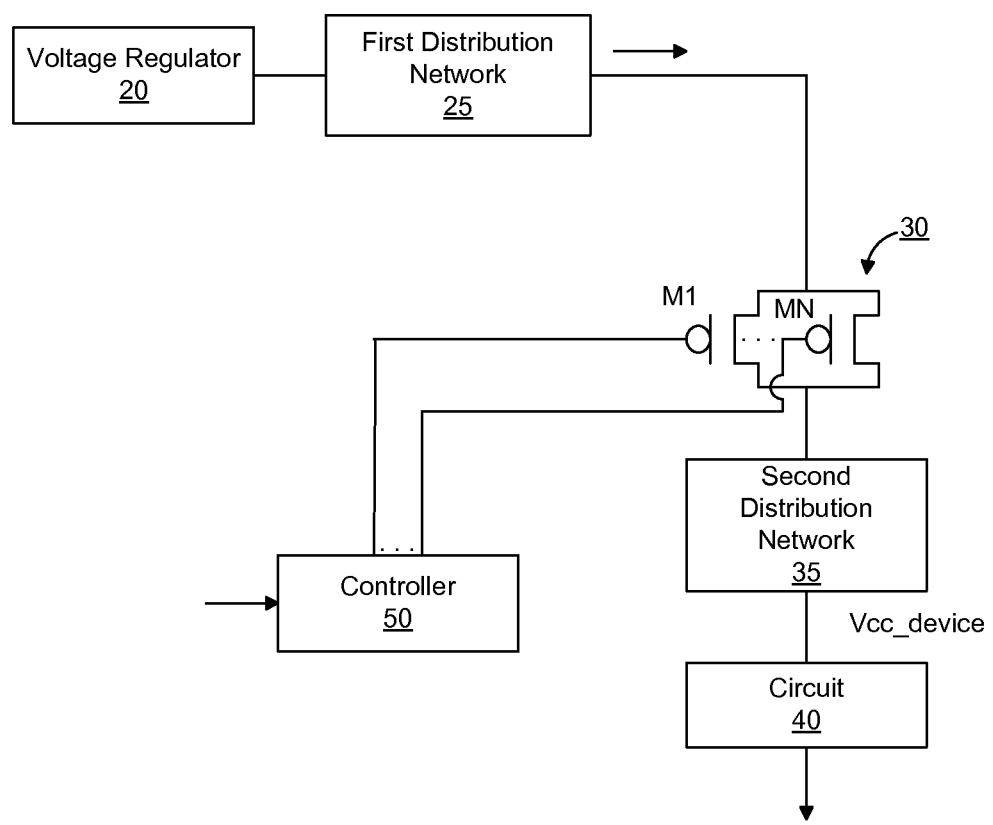
FIG. 1 is a block diagram of a power distribution system in accordance with an embodiment of the present invention.

Referring now to FIG. 1, shown is a block diagram of a power distribution system in accordance with an embodiment of the present invention. As shown in FIG. 1, system 10 may be used to provide a regulated voltage to an integrated circuit such as a processor. Although the embodiments described herein are with regard to a multicore processor, understand the scope of the present invention is not limited in this regard, and other embodiments may be used in connection with other integrated circuits or other electronic devices that benefit from a regulated and controllable voltage delivered with a high degree of control.

As seen in FIG. 1, system 10 includes a voltage regulator 20. In various embodiments, voltage regulator 20 may be an off-chip regulator that provides a regulated voltage to a first distribution network 25. First distribution network 25 may include the circuitry such as wires, coupling elements and so forth that provide the regulated voltage to circuitry within the processor. In turn, the voltage output from distribution network 25 may be provided through a power gate circuit 30 and through a second distribution network 35, which may similarly include circuitry such as wires, coupling elements and so forth, to thus provide a regulated voltage to a circuit 40. Note that a device voltage, $V_{cc\_device}$, may be provided at the output of this second distribution network to circuit 40. In the embodiment of FIG. 1, circuit 40 may correspond to some or all circuitry of the multicore processor or other such integrated circuit.

As seen in FIG. 1, power gate 30 may be implemented as a plurality of switching devices. In the specific embodiment shown, a plurality of metal oxide semiconductor field effect transistors (MOSFETs) M1-Mn may be present. In one implementation, each MOSFET may be a P-channel MOSFET (PMOS) although other implementations may use N-channel MOSFETs (NMOS) or other such switching devices. For the circuit shown in FIG. 1, each PMOS device M1-Mn may be gated by a control signal received from a controller 50 at a gate terminal of the PMOS device. Thus when enabled, the regulated voltage may be provided to circuit 40, e.g., from a source terminal to a drain terminal of each of the MOSFETs. Thus the enabled switches provide via second distributed network 35 a power gated voltage $V_{cc\_device}$. As will be described further below, controller 50 may operate to control these switches based on various inputs. In general, the inputs may correspond to information regarding operating parameters of the processor, including its activity level, various overheads, fixed values and so forth, as will be described further below.

Figure 2:
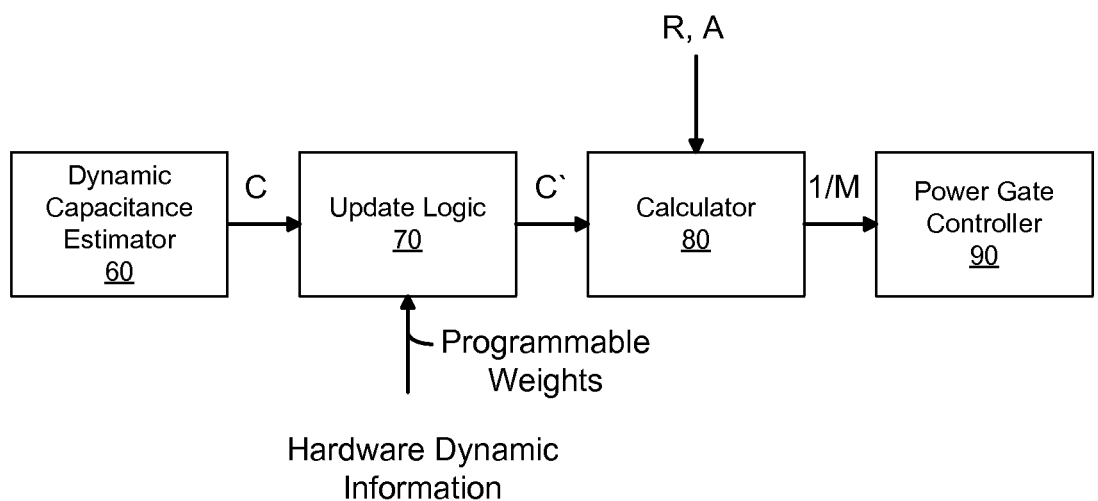
FIG. 2 is a block diagram of a controller in accordance with an embodiment of the present invention.

Referring now to FIG. 2, shown is a block diagram of a controller in accordance with an embodiment of the present invention. As shown in FIG. 2, controller 50 may include various configurable logic, other hardware, firmware and combinations thereof to generate control signals for power gate circuitry. As seen, controller 50 includes a dynamic capacitance estimator 60, which as will be described further below, may receive inputs regarding the activity level of the processor. Accordingly, estimator 60 may generate an estimated capacitance ratio, which in one embodiment may correspond to: $C=C_{dyn\_app}/C_{dyn\ power\ virus}$, where $C_{dyn-app}$ is a dynamic capacitance of a current workload being executed on the processor (or a portion under analysis) and $C_{dyn\ power\ virus}$ is a dynamic capacitance of a maximum workload corresponding to a power virus executed on the processor (or portion).

Accordingly, estimator 60 provides an estimated ratio C to an update logic 70. In various embodiments, update logic 70 may modify or update this ratio to an updated value C'. To this end, update logic 70 may receive various information including additional hardware dynamic information such as information regarding stalls, clock gating signals, data patterns and so forth, along with, in some embodiments, programmable weights.

Based on all of this information, update logic 70 may generate an updated ratio C' which is provided to a power gate setting calculator 80. In one embodiment, the update logic 70 may generate C' using, e.g., an addition or subtraction of a predetermined number of bits. In various embodiments, calculator 80 may calculate a power gate setting using this updated ratio value, along with a ratio of impedance value R and a ratio of a power value A. In one embodiment, this ratio of impedance value R may be calculated according to: $R=R_{PG\_PowerVirus}/R_{LoadLine}$, where $R_{PG\_PowerVirus}$ is the power gate impedance (when fully on) and $R_{LoadLine}$ is the total load line impedance. In one embodiment, this ratio power value A may be calculated according to: $A=P_{AC\_PowerVirus}/P_{PowerVirus}$, where $P_{AC\_PowerVirus}$ power while the processor is executing a power virus application and $P_{PowerVirus}$ is the total power of the processor while executing the power virus application. In one embodiment, calculator 80 may calculate a power gate setting corresponding to 1/M, where 1/M corresponds to a portion of the width of the power gates which should be left enabled to optimize/minimize overvoltage. In other words M can be defined as: $M=W_{PG\_PowerVirus}/W_{PG\_App}$, where $W_{PG\_PowerVirus}$ is the total width of all power gates enabled in the core during power virus application while $W_{PG\_App}$, is the total width of the power gates to be enabled to minimize over-voltage during a typical application.

This power gate setting value 1/M may be provided to a power gate controller 90. In one embodiment, power gate controller 90 may generate control signals based on this power gate setting. For example, power gate controller 90 can set some control signals to be, e.g., active low (assuming that the power gates are PMOS devices such that these switch devices will be enabled). In contrast, inactive high signals will be generated for corresponding switches that are to remain off. Although shown at this high level in the embodiment of FIG. 2, understand the scope of the present invention is not limited in this regard.

Figure 3:
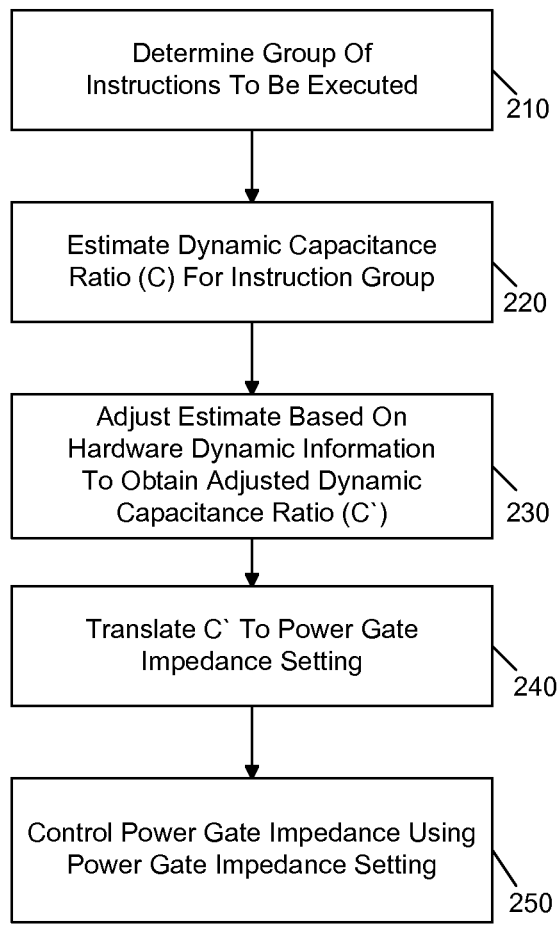
FIG. 3 is a flow diagram of a method of performing dynamic power gating in accordance with an embodiment of the present invention.

Referring now to FIG. 3, shown is a flow diagram of a method of performing dynamic power gating in accordance with an embodiment of the present invention. As shown in FIG. 3, method 200 can be performed, at least in part by a controller coupled to a power gate circuit. In one embodiment, this controller may be implemented as logic of a power control unit (PCU) of a processor, although the controller can be located in other places in different embodiments. Note that the operations can be performed in middleware running on top of the actual hardware, and converting instructions of the higher level software (such as an OS or applications) to the native, hardware code. As seen, method 200 may begin by determining a group of instructions to be executed (block 210). For example, an instruction window of a given size, e.g., instructions to be executed in a given number of cycles of the processor (e.g., 5-10 cycles) may be grouped together. From this instruction group, an estimated dynamic capacitance ratio (C) can be estimated (block 220). Details of the estimation performed will be discussed further below. Suffice to say however the estimation can be based on the approximate dynamic capacitance caused by execution of the instructions. This in turn can be based at least in part on the type of instructions being executed and more particularly on the types of processor circuitry used to execute such instructions.

Still referring to FIG. 3, control next passes to block 230 where this ratio can be adjusted. More specifically, the value can be adjusted based on hardware dynamic information, which will be discussed further below. Accordingly, an adjusted dynamic capacitance ratio (C') may be determined. Next, control passes to block 240 where this adjusted ratio, C', may be translated to a power gate impedance setting (block 240). Then, the power gate impedance can be controlled using this power gate impedance setting (block 250). For example, control signals can be sent from the controller to switches of the power gate circuitry to thus cause at least some of the switches to be enabled and some disabled to thus provide an appropriate level of voltage to the processor circuitry. Although discussed at this high level in the embodiment of FIG. 3, understand the scope of the present invention is not limited in this regard.

Figure 4:
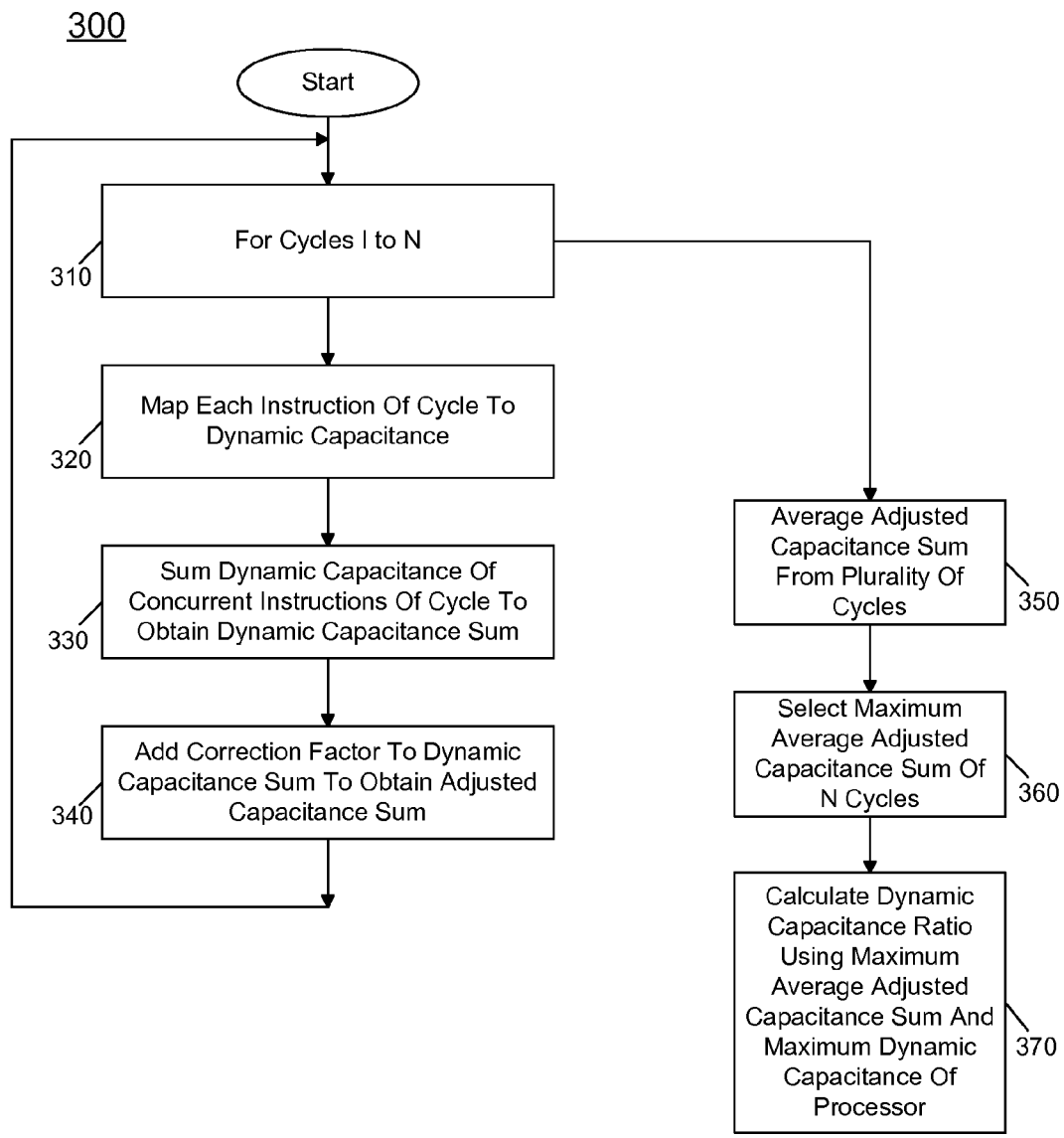
FIG. 4 is a flow diagram of a method for estimating dynamic capacitance in accordance with one embodiment of the present invention.

Referring now to FIG. 4, shown is a flow diagram of a method for estimating dynamic capacitance in accordance with one embodiment of the present invention. Method 300 also can be implemented in the same controller as the operations of FIG. 2. More specifically, method 300 may correspond to further details regarding the operations performed at block 220 of FIG. 3.

As seen, method 300 may provide a loop of operations to be performed for each clock cycle of an instruction grouping window. As discussed above in one embodiment this window can be between approximately 5-10 cycles in one embodiment. For each such cycle of a window, control begins at block 310 and passes to block 320 where each instruction of the cycle can be mapped to a dynamic capacitance (block 320). In one embodiment, a table-based mapping can be performed such that for each instruction type, a given capacitance value can be determined. As discussed above in one embodiment this capacitance can be based on the types of circuitry that are enabled for execution of the instruction. In some embodiments this table can be fixed and stored, e.g., in a non-volatile storage. However in other embodiments, this table can be dynamically generated, and may be updated when processor temperature and/or other parameters such as a supply voltage exceeds a certain threshold.

Still referring to FIG. 4, next control passes to block 330 where the dynamic capacitance of the concurrently executed instructions of the cycle can be summed to obtain a dynamic capacitance sum. Next control passes to block 340 where a correction factor can be added to this dynamic capacitance sum to thus obtain an adjusted capacitance sum. This loop of blocks 310-340 can be performed for every cycle of the instruction window under analysis. Upon conclusion control next passes to block 350.

At block 350, the adjusted capacitance sums can be averaged from multiple cycles of the instruction window to thus obtain an average adjusted capacitance sum for each cycle. As one example, three cycles within this larger instruction grouping window can be averaged such that each cycle is associated with an average value that is the average of multiple cycles within the window. Still referring to FIG. 4, control next passes to block 360 where the maximum of these average adjusted capacitance sums can be selected. Thus for an instruction window of, e.g., 10 cycles, the average adjusted capacitance sum having the highest value can be selected. Using this value at block 370, a dynamic capacitance ratio can be calculated. More specifically, this ratio can be calculated using this maximum average adjusted capacitance sum and the maximum capacitance of the processor, which in one embodiment can correspond to a dynamic capacitance value for a power virus. Accordingly, method 300 may generate an estimated dynamic capacitance ratio which in the embodiment shown may be used in further processing such as discussed above in regard to FIG. 3.

Thus as set forth in the above flow diagrams, various steps or phases may be performed in a DPG control flow to set the power gate impedance to an optimal point. As an example, these steps may include: estimating a Cdyn ratio (C) for a given set of instructions; modifying the Cdyn estimate with additional hardware dynamic information (C=>C'); translating the adjusted Cdyn into a power gate impedance setting (C'=>1/M); and setting impedance of the power gate circuitry to enable/disable only a certain percentage of the total circuit.

In this example embodiment, estimating Cdyn is the first step in the process of setting the power gates correctly. Typically, an instruction performs different operations, such as addition (ADD), multiplication (MULT), load (LD) and similar operations. This is illustrated in Table 1, where instructions executed in 7 consecutive cycles are shown.

TABLE 1

| | Pipe | | | | | |
|---|---|---|---|---|---|---|
| Cycle | PIPE1 | PIPE2 | PIPE3 | PIPE4 | PIPE5 | PIPE ... PIPEN |
| 1 | | ADD | LD | | | |
| 2 | ADD | | | | | |
| 3 | ADD | MUL | LD | | | |
| 4 | ADD | | | | | |
| 5 | SUB | | | | | |
| 6 | ADD | MUL | LD | ST | | |
| 7 | ADD | | | | | BRC |

Then as shown in Table 2, each instruction is assigned an appropriate Cdyn value. Then as shown in Table 3, a C ratio (with respect to a maximum C value (Cpv)) is derived (right-most column). Note that numbers used in the Table are just an example of various Cdyn values that instructions may use.

TABLE 2

| | Pipe | | | | | |
|---|---|---|---|---|---|---|
| Cycle | PIPE1 | PIPE2 | PIPE3 | PIPE4 | PIPE5 | PIPE ... PIPEN |
| 1 | | 1 | 1.4 | | | |
| 2 | 1 | | | | | |
| 3 | 1 | 1.3 | 1.4 | | | |
| 4 | 1 | | | | | |
| 5 | 1 | | | | | |
| 6 | 1 | 1.3 | 1.4 | 1.3 | | |
| 7 | 1 | | | | | 1.1 |

TABLE 3

| Cdyn Sum Per Cycle | Cdyn Sum Per Cycle + Cdyn Correction Factor | Average Across Window (Size = 3) | Cdyn Estimate | C ratio (Assuming CdynPV = 10) |
|---|---|---|---|---|
| 2.4 | 2.8 | 2.8 | 3.1 | 0.3 |
| 1 | 1.4 | 2.3 | | |
| 3.7 | 4.1 | 2.3 | | |
| 1 | 1.4 | 2.7 | | |
| 1 | 1.4 | 3.1 | | |
| 5 | 5.4 | ... | | |
| 2.1 | 2.5 | ... | | |

Different manners of estimating Cdyn for a section of code can occur. In an example embodiment, the following steps may be used: mapping each instruction to a corresponding Cdyn value, as each such instruction uses different amounts of transistor activity to accomplish different tasks, as illustrated in Table 2; combining Cdyn values of each concurrently executed instruction (e.g., by adding them together as shown in "Cdyn Sum per Cycle" column of Table 3) to calculate Cdyn for a given cycle; adding fixed Cdyn costs like Cdyn idle or Cdyn associated with blocks which run regardless of how many instructions are being executed (as shown in column titled "Cdyn Sum per Cycle+ Cdyn correction factor" of Table 3). In the example in Table 3, 0.4 was added to every row/cycle. Next, Cdyn values for each cycle can be averaged with values in adjacent cycles over a given averaging window. This windowed average may be used to account for pipeline stages and for existing local charge which is shared from cycle to cycle. This is illustrated in column titled "Average across Window" of Table 3. In this particular case, a window size of 3 may be used. Finally, the worst case Cdyn may be selected for a given code window (column "Cdyn estimate"), which in the embodiment of Table 3 is expressed in terms of the Cdyn ratio (C). Cdyn ratio is the ratio of Cdyn of the code under analysis to the Cdyn of the power virus. In Table 3, it is assumed that the power virus Cdyn is 10, and thus a ratio of 0.3 is obtained.

Table 4 below thus shows that following the Cdyn estimation step, the estimate may be modified to account for certain additional hardware dynamic information which may occur while code is running. Such modification may incorporate effects that cannot be predicted well in the Cdyn estimation. As examples, these modifications may cover events such as processor stalls, major clock gating signals and extremely rare data patterns. For example, if the processor repeatedly misses in the cache, and has to wait for the data to come from external memory, processor activity will be diminished and the initial Cdyn estimate may be changed. This modified Cdyn ratio C' thus includes effects of dynamic information.

TABLE 4

| C ratio (from Table 3) | | | 0.3 | |
|---|---|---|---|---|
| Modifications | | | | ↓ |
| | Activity (Hardware Signals) | Weight | Contribution | ↓ |
| Increased Cache Activity | 1 | 0.1 | 0.1 | ↓ |
| Back End Stall | 1 | −0.2 | −0.2 | ↓ |
| Front End Stall | 0 | −0.1 | 0 | ↓ |
| ... | ... | ... | ... | ↓ |
| ... | ... | ... | ... | ↓ |
| | | Total Modification | −0.1 | ↓ |
| C' ratio | | | 0.2 | |

An example of such modification in accordance with one embodiment of the present invention is shown in Table 4, above. As shown in Table 4, the initial C estimate was 0.3. Cache activity increases it by 0.1; back-end pipeline stall decreases it by 0.2, while the front end is still running. This results in net decrease of 0.1. As such, the final Cdyn ratio (C') estimate is therefore 0.2, rather than the initial estimate (C) of 0.3. Next, this final Cdyn ratio (C') may be converted to a power gate setting (1/M). In an embodiment, this conversion may depend on the following parameters: R, corresponding to a ratio of PG impedance (when fully on) to total load line impedance; and A, corresponding to a ratio of power virus active power to power virus total power. Each parameter is dependent on supply voltage and temperature. 1/M is given by the following expression:

$$\frac{1}{M} = \frac{1+(C'-1)A}{1+\frac{R-1}{R}(C'-1)A}.$$

This calculation can be implemented in many different ways. One approach is a large lookup table containing 1/M values for all expected/quantized values of C', R and A. To be more efficient, a small lookup table may be used that contains only a subsection of slowly changing parameters such as R and A. The smaller table may periodically be updated as Vcc and temperature changes outside of a given range (e.g., exceed/decrease past given thresholds). The input to this small table may thus be C', and the output 1/M. This value of 1/M corresponds to a portion of the width of the power gates that can be maintained enabled to optimize/ minimize over-voltage. Therefore, based on this control value, 1-1/M power gates may be disabled, increasing power gate impedance M times and absorbing unnecessary over-voltage. This reduces overall power by minimizing $V_{cc\_device}$, which directly decreases $\Delta Vcc$ over which each node in the circuit switches and by minimizing leakage through the circuit.

Note that more than one DPG zone/calculation can be performed per circuit (e.g., core) to account for spatial differences in circuit activity and voltage drop. That is, multiple zones can be defined per circuit, and multiple decisions, calculations, and 1/M settings can be derived and different amounts of the power gates can be left enabled per different sections of the circuit/core. Thus according to various embodiments, dynamic capacitance can be estimated and converted to power gate settings. As such, the dynamic capacitance can be dynamically estimated and based on that value, only a portion of the power gates can be enabled/disabled to optimize the load line. Thus in various embodiments, semiconductor products may, on average, use less power than products without a dynamic power meter in accordance with an embodiment of the present invention.

A control system for performing DPG as described herein may receive various inputs and estimate an appropriate setting for the impedance of the power gate circuitry (e.g., disabling correct portions of the power gates to achieve appropriate voltage drop). To effect correct control of the DPG operation, good estimates for the current consumption may be obtained. If current is underestimated, power gate impedances will be set too high and result in too high of an IR drop. In turn, this will result in a Vcc_device that is lower than the target and may cause incorrect computation. On the other hand, if current draw is overestimated, some over-voltage at the circuit will diminish the power savings.

Figure 5:
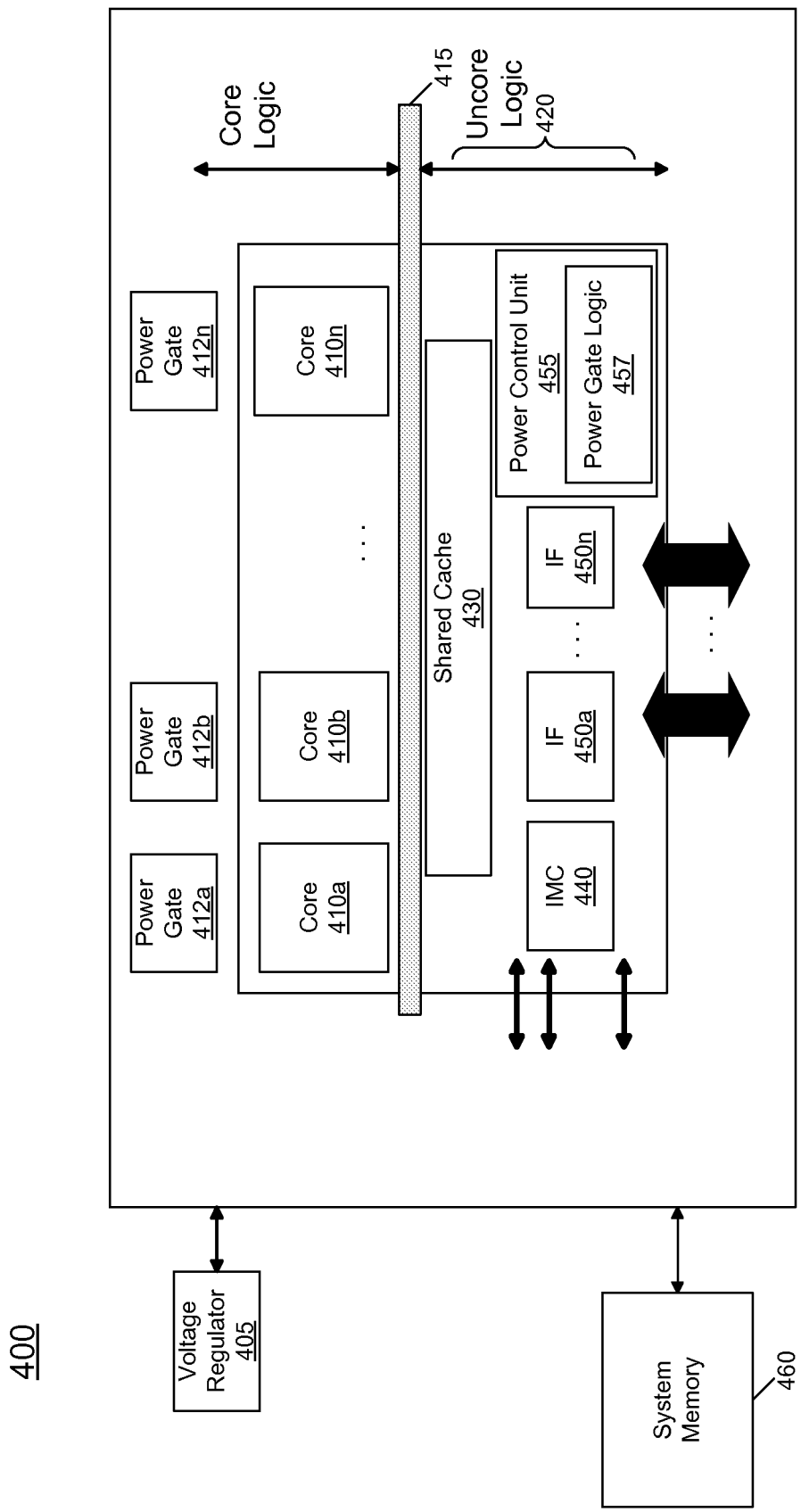
FIG. 5 is a block diagram of a processor in accordance with an embodiment of the present invention.

Referring now to FIG. 5, shown is a block diagram of a processor in accordance with an embodiment of the present invention. As shown in FIG. 5, processor 400 may be a multicore processor including a plurality of cores $410_a$-$410_n$. As seen, each core can be coupled to receive a supply voltage from a corresponding power gate circuit $412_a$-$412_n$. In some embodiments, power gate circuits 412 may act as a linear regulator to provide regulated voltage to the corresponding core.

In various embodiments, these power gate circuits can be controlled to act as a switch to turn off power to the core when the core is in a low power state to thus reduce power consumption. Furthermore, in accordance with various embodiments based on the actual instructions being executed on the core (or based on another measure of core utilization) a controllable impedance of the corresponding power gate circuit(s) can be updated to thus reduce an over-voltage provided to the corresponding core to again reduce power consumption by reduction of both active and leakage power.

As seen in the embodiment of FIG. 5, a voltage regulator 405 can be coupled to processor 400 to provide a regulated voltage, that in turn can be coupled to each of the power gate circuits. Note that although shown with a corresponding power gate circuit per core, understand the scope of the present invention is not limited in this regard and in other implementations, a single power gate circuit can be associated with all the cores, or more finer-grained control can be realized by providing multiple power gate circuits per each core or other portion of the processor circuitry.

Furthermore, by providing multiple power gate circuits which can be independently controlled it is possible to provide an ability to allow one or more of the voltage regulators to provide a greater delivery to a corresponding core when one or more other cores are in a low power state. That is, in some embodiments the control of the power gate circuits can be based on information regarding the state of all of these power gate circuits. When one or more such power gate circuits is presenting a full impedance (such that no voltage is provided to the corresponding core) one or more enabled power gate circuits can deliver a greater voltage if desired to corresponding cores to possibly enable greater performance levels. This is so, as these internal load line portions that do not consume any of the current means that current is available for other portions of the internal load line, all of which collectively couple to the external load line to the voltage regulator.

Still further, by providing multiple power gate circuits in connection with a shared load line implementation, it may be possible to reduce an over-voltage present on a shared portion of the load line when one of multiple circuits (e.g., one of multiple cores) is operating at less than a power virus level. For example, assume a shared load line implementation in which a portion of the load line is shared and a non-shared portion of the load line is independently coupled to each of multiple cores. In general, a voltage provided on the shared load line will be set sufficient to operate the multiple cores when they are all operating at a power virus level. Assume that one of the cores reduces its power consumption to, e.g., half the power virus level. In this instance, an over-voltage may exist on the shared portion of the load line. By providing information regarding this reduced load level of the core, e.g., by way of appropriate control of that power gate circuit, the power gate circuit for the other core (which may still be operating at a power virus level) can be selectively controlled to increase its impedance to thus resolve the over-voltage on the shared portion of the load line. By using such an implementation, power reductions of 2× or greater vs. independent control can be achieved by using information from these different power gate circuits. Note that in such implementations, a rapid reduction in impedance may occur when the previously lower operating level-core begins operating at a higher level, e.g., corresponding to a power virus level.

The various cores may be coupled via an interconnect 415 to an uncore or system agent logic 420 that includes various components. As seen, the uncore 420 may include a shared cache 430 which may be a last level cache. In addition, the uncore may include an integrated memory controller 440, various interfaces 450 and a power control unit 455.

In various embodiments, power control unit 455 may include a power gate logic 457 that in one embodiment may execute firmware to realize the dynamic capacitance estimation and corresponding power gate impedance control. In this way power gate logic 457 can determine an appropriate impedance for the corresponding power gate circuits. Note that although shown at this location in the embodiment of FIG. 5, understand the scope of the present invention is not limited in this regard. For example, in other implementations it is possible to provide local controllers associated with each power gate circuit which can be implemented as a combination of software, firmware and/or hardware, such as a middleware layer that can determine dynamic capacitance and perform corresponding power gate circuit control based on incoming instructions to be executed, while the code is being scheduled to run on the underlying microarchitecture.

With further reference to FIG. 5, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

Figure 6:
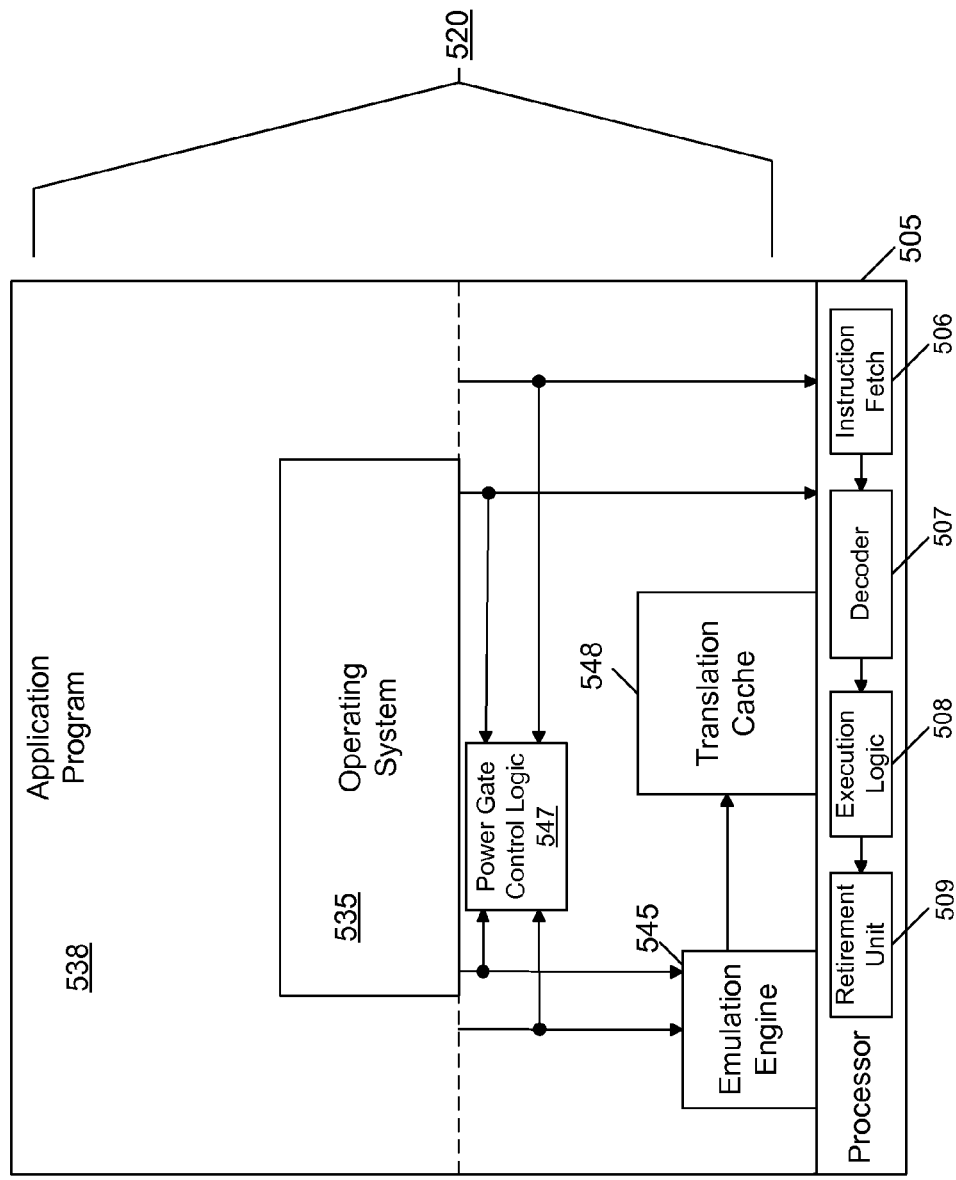
FIG. 6 is a block diagram of a co-design environment including a processor and a memory according to one embodiment.

Referring now to FIG. 6, a co-design environment 500 includes a processor 505 and a memory 520 which in one embodiment may be a system memory such as a dynamic random access memory (DRAM). As seen, processor 505 may have a given micro-architecture and may be coupled to memory 520 by way of, e.g., a point-to-point interconnect, bus or other such manner. As seen, processor 505 which may be a co-design processor, includes front end units such as an instruction fetcher 506 that can receive instructions directly from the OS or application programs. These instructions, which may be macro-instructions, e.g., corresponding to user-level instructions of an application program can be decoded using a decoder 507, which may operate to decode the instruction and access corresponding micro-operations (uops), e.g., present in a microcode storage of processor 505. In turn, decoder 507 may provide the uops to one or more execution units 508, which may include various arithmetic logic units (ALUs), specialized hardware and other types of computation units. Results from these instructions may be provided to a retirement unit 509, which operates to retire the instructions to thus store the results to an architectural state of the processor in program order, if no fault or exceptions occurred. While described as an in-order machine, embodiments can equally be implemented using an out-of-order machine.

In a visible portion of memory 520, namely a first portion 530, one or more operating systems 535 and application programs 538 may be stored. This portion is termed "visible" as it can be visible to user-level code (i.e., the application program 538) and visible to the OS (both OS 535 and program 538). Depending on the type of instructions to be executed in these programs, communication may be directly with processor 505, e.g., by way of using instruction decoders present in the processor to handle such instructions.

Alternately, for various code sequences that can be optimized using translated code or for such sequences in which micro-architecture support is not provided, embodiments may use a concealed portion of the memory, namely a second portion 540, in order to provide translated code to processor 550. Specifically, as seen, both OS 535 and application program 538 may communicate with an emulation engine 545, which may include a runtime execution unit including interpretation, translation and optimization mechanisms. Note that concealed memory 540 is not visible or accessible to the OS or application programs. Emulation engine 545 may thus provide code and address information to a translation cache 548, which may include translated code that can be provided to processor 505 for execution. In one embodiment, code stored in translation cache 548 may be encrypted. This translated code may be written and optimized for the underlying micro-architecture of the processor, e.g., target ISA code.

As further seen in FIG. 6, a power gate control logic 547 may also be present. As seen, the incoming instructions provided to emulation engine 545 may further be received in power gate control logic 547. Based on these incoming instructions, power gate control logic 547 may determine a dynamic capacitance for given windows of instructions, and based on this information determine an appropriate power gate impedance to be applied during execution of the instructions. In an embodiment, this information regarding the dynamic power gate impedance can be implemented by way of an instruction which thus can be generated by emulation engine 545 and may act as the first instruction to be executed within the window. Note that in some embodiments it is further possible to determine dynamic capacitance and corresponding power gate impedance control based on instructions that are provided directly to processor 505.

Figure 7:
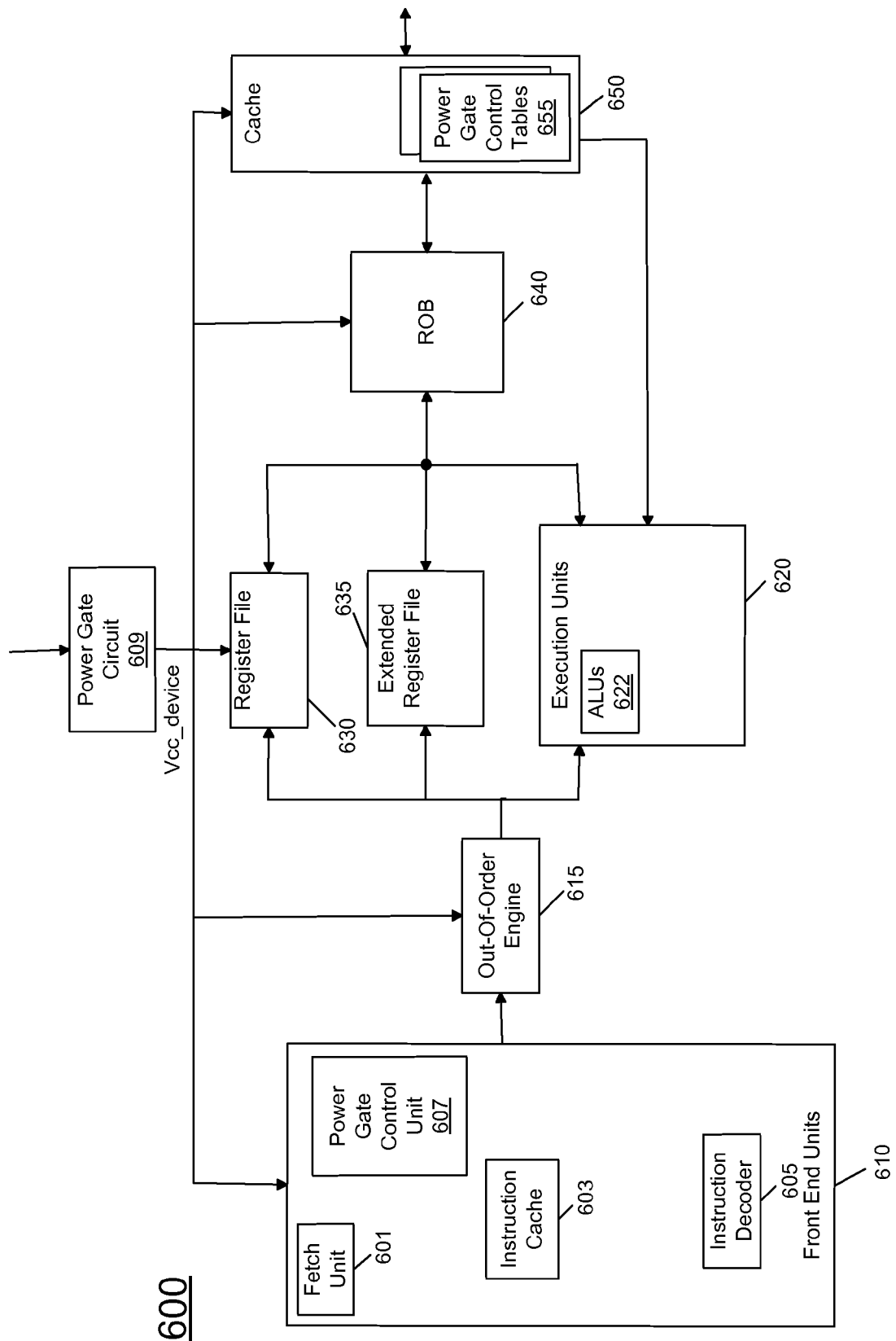
FIG. 7 is a block diagram of a processor core in accordance with one embodiment of the present invention.

Referring now to FIG. 7, shown is a block diagram of a processor core in accordance with one embodiment of the present invention. As shown in FIG. 7, processor core 600 may be a multi-stage pipelined out-of-order processor. As shown in FIG. 7, core 600 may operate at a voltage received via a power gate circuit 609, which can be controlled as described herein. Note that power gate circuit 609 may apply the Vcc_device voltage to all components of the core if only one DPG domain is used. In a case of multiple DPG domains, each block may have a separate power gate circuit, and a separate (logically) Vcc_device.

As seen in FIG. 7, core 600 includes front end units 610, which may be used to fetch instructions to be executed and prepare them for use later in the processor. For example, front end units 610 may include a fetch unit 601, an instruction cache 603, and an instruction decoder 605. In some implementations, front end units 610 may further include a trace cache, along with microcode storage as well as a micro-operation storage. Fetch unit 601 may fetch macro-instructions, e.g., from memory or instruction cache 603, and feed them to instruction decoder 605 to decode them into primitives, i.e., micro-operations for execution by the processor. As further seen, front end units 610 can include a power gate control unit 607 which can be used to determine a dynamic capacitance and generate control signals for power gate circuit 609 based thereon. This determination can be based on the incoming instructions being handled in front end units 610, as well as information present in power gate control tables 655, which may be present in a cache memory 650. Specifically, these tables can incorporate information regarding the capacitance values for corresponding instructions, various hardware information, correction factors and so forth, and expected/quantized values for the power gate control signals, impedance ratios and power ratios, as discussed above.

Coupled between front end units 610 and execution units 620 is an out-of-order (OOO) engine 615 that may be used to receive the micro-instructions and prepare them for execution. More specifically OOO engine 615 may include various buffers to re-order micro-instruction flow and allocate various resources needed for execution, as well as to provide renaming of logical registers onto storage locations within various register files such as register file 630 and extended register file 635. Register file 630 may include separate register files for integer and floating point operations. Extended register file 635 may provide storage for vector-sized units, e.g., 256 or 512 bits per register.

Various resources may be present in execution units 620, including, for example, various integer, floating point, and single instruction multiple data (SIMD) logic units, among other specialized hardware. For example, such execution units may include one or more arithmetic logic units (ALUs) 622, among other such execution units.

Results from the execution units may be provided to retirement logic, namely a reorder buffer (ROB) 640. More specifically, ROB 640 may include various arrays and logic to receive information associated with instructions that are executed. This information is then examined by ROB 640 to determine whether the instructions can be validly retired and result data committed to the architectural state of the processor, or whether one or more exceptions occurred that prevent a proper retirement of the instructions. Of course, ROB 640 may handle other operations associated with retirement.

As shown in FIG. 7, ROB 640 is coupled to cache 650 which in one embodiment may be a low level cache (e.g., an L1 cache), although the scope of the present invention is not limited in this regard. Also, execution units 620 can be directly coupled to cache 650. From cache 650, data communication may occur with higher level caches, system memory and so forth. While shown with this high level in the embodiment of FIG. 7, understand the scope of the present invention is not limited in this regard. For example, while the implementation of FIG. 7 is with regard to an out-of-order machine such as of a so-called x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 8:
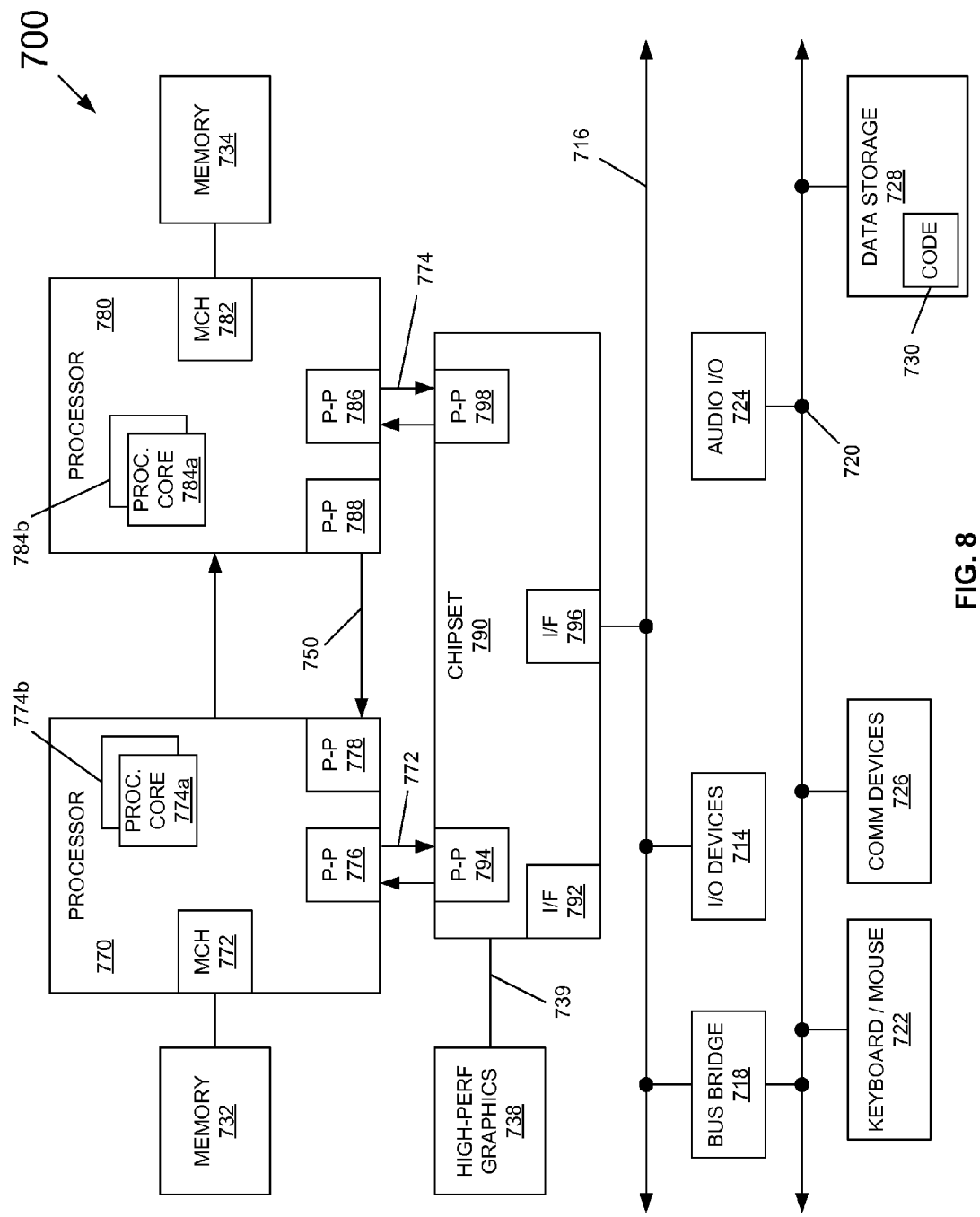
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 700 is a point-to-point interconnect system, and includes a first processor 770 and a second processor 780 coupled via a point-to-point interconnect 750. As shown in FIG. 8, each of processors 770 and 780 may be multicore processors, including first and second processor cores (i.e., processor cores 774*a* and 774*b* and processor cores 784*a* and 784*b*), although potentially many more cores may be present in the processors. Each of the processors can include logic to determine dynamic capacitance and control power gate circuitry accordingly, as described herein.

Still referring to FIG. 8, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 8, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 752 and 754, respectively. As shown in FIG. 8, chipset 790 includes P-P interfaces 794 and 798.

Furthermore, chipset 790 includes an interface 792 to couple chipset 790 with a high performance graphics engine 738, by a P-P interconnect 739. In turn, chipset 790 may be coupled to a first bus 716 via an interface 796. As shown in FIG. 8, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720. Embodiments can be incorporated into other types of systems including mobile devices such as a smart cellular telephone, tablet computer, netbook, ultrabook, or so forth.

The following examples pertain to further embodiments. According to one aspect, an apparatus includes an estimation logic to estimate a dynamic capacitance of a circuit (e.g., a core) of a processor during a window of instructions occurring during a group of processor cycles. Then, based on this estimate, a power gate calculator may calculate a control value for a power gate circuit that is coupled to a load line and between a voltage regulator and the circuit. Next, a controller may control an impedance of the power gate circuit based on this control value. In some embodiments, an update logic may be used to modify the dynamic capacitance estimate based on hardware dynamic information.

In an embodiment, the dynamic capacitance estimate may be a ratio between the dynamic capacitance estimate of the first processor circuit during the first processor cycles and a dynamic capacitance of the first processor circuit during execution of a power virus. The update logic can add or subtract a predetermined value from the dynamic capacitance estimate to obtain the modified dynamic capacitance. A mapping table may include entries each to map an instruction type to a capacitance value. The controller may increase the impedance of the power gate circuit to absorb an over-voltage output by the voltage regulator in the power gate circuit to reduce power consumption of the processor.

Another aspect includes a method for estimating dynamic capacitance of the circuit during execution of an instruction group, adjusting the dynamic capacitance estimate based on hardware dynamic information to obtain an adjusted dynamic capacitance estimate, and controlling an impedance of the power gate circuit based on the adjusted dynamic capacitance estimate.

This estimation may include, for each cycle within the instruction group: mapping each instruction of a cycle to a dynamic capacitance; summing the dynamic capacitance of concurrent instructions of the cycle to obtain a dynamic capacitance sum; and adding a correction factor to the dynamic capacitance sum to obtain an adjusted capacitance sum. The estimation may further include: averaging the adjusted capacitance sum from a subset of the cycles, to obtain an average adjusted capacitance sum for each of the cycles within the instruction group; and selecting the maximum average adjusted capacitance sum of the cycles. The estimation may further include calculating a dynamic capacitance ratio using the maximum average adjusted capacitance sum and a maximum dynamic capacitance of the processor. In an embodiment, this estimating of the dynamic capacitance can be done when the instruction group is translated into machine instructions for execution in the processor. In an embodiment, an instruction can be stored to cause adjustment to an impedance of the power gate circuit based on the dynamic capacitance estimate with the machine instructions in a translation cache of the processor, and the impedance of the power gate circuit at a beginning of execution of the machine instructions output from the translation cache can be controlled using the instruction.

A still further aspect is directed to a system with a multicore processor, a voltage regulator coupled to the multicore processor to provide a regulated voltage, and a DRAM coupled to the multicore processor. The processor may include one or more power gate circuits coupled between a load line and its cores, and a controller. This controller may be configured to adjust an impedance of the power gate circuit(s) between a maximum and minimum impedance responsive to execution of different groups of instructions in one or more of the cores, to reduce an over-voltage provided to the core(s).

The power gate circuit may be configured to increase the impedance of the power gate circuit to absorb an over-voltage output by the voltage regulator in the power gate circuit to reduce power consumption of the processor. In an embodiment, the multicore processor may further include an engine to translate the first instruction group into a first machine instruction group and store the first machine instruction group in a translation cache, and cause generation of an instruction to cause adjustment to the impedance of the power gate circuit.

A still further aspect is directed to an apparatus having means for estimating a dynamic capacitance of circuit means during a first plurality of cycles, means for calculating a control value for a power gate circuit coupled to a load line and between a voltage regulator and the circuit means based on the dynamic capacitance estimate, and means for controlling an impedance of the power gate circuit based on the control value. In one implementation, a means for modifying the dynamic capacitance estimate from the means for estimating based on hardware dynamic information may be present.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
an estimation logic to estimate a dynamic capacitance of a first processor circuit of the processor during a first plurality of processor cycles, wherein the dynamic capacitance estimate comprises a ratio between the dynamic capacitance estimate of the first processor circuit during the first plurality of processor cycles and a dynamic capacitance of the first processor circuit during execution of a power virus;
a power gate calculator to calculate a control value for a power gate circuit coupled to a load line and between a voltage regulator and the first processor circuit based on the dynamic capacitance estimate, wherein the control value is to control a width of the power gate circuit; and
a controller to control an impedance of the power gate circuit based on the control value to absorb an over-voltage.

2. The processor of claim 1, further comprising an update logic to modify the dynamic capacitance estimate from the estimation logic based on hardware dynamic information.

3. The processor of claim 2, wherein the update logic is to adjust the dynamic capacitance estimate with a first value to obtain the modified dynamic capacitance.

4. The processor of claim 1, further comprising a mapping table including a plurality of entries each to map an instruction type to a capacitance value.

5. The processor of claim 1, wherein the controller is to increase the impedance of the power gate circuit to absorb the over-voltage output by the voltage regulator in the power gate circuit to reduce power consumption of the processor.

6. A method comprising:
estimating dynamic capacitance of a first processor circuit during execution of an instruction group, including, for each of a plurality of cycles within the instruction group:
mapping each instruction of a cycle to a dynamic capacitance;
summing the dynamic capacitance of concurrent instructions of the cycle to obtain a dynamic capacitance sum; and
adding a correction factor to the dynamic capacitance sum to obtain an adjusted capacitance sum;
adjusting the dynamic capacitance estimate based on hardware dynamic information to obtain an adjusted dynamic capacitance estimate; and
controlling an impedance of a power gate circuit coupled to a load line and between a voltage regulator and the first processor circuit according to a control value to adjust a width of the power gate circuit based on the adjusted dynamic capacitance estimate, to absorb an over-voltage.

7. The method of claim 6, wherein estimating the dynamic capacitance for the instruction group further includes, for each of the plurality of cycles within the instruction group:
averaging the adjusted capacitance sum from a subset of the plurality of cycles, to obtain an average adjusted capacitance sum for each of the plurality of cycles within the instruction group; and
selecting the maximum of the average adjusted capacitance sum of each of the plurality of cycles.

8. The method of claim 7, wherein estimating the dynamic capacitance for the instruction group further includes calculating a dynamic capacitance ratio using the maximum average adjusted capacitance sum and a maximum dynamic capacitance of the processor.

9. The method of claim 6, further comprising estimating the dynamic capacitance when the instruction group is translated into machine instructions for execution in the processor.

10. The method of claim 9, further comprising storing an instruction to cause adjustment to the impedance of the power gate circuit based on the dynamic capacitance estimate with the machine instructions in a translation cache of the processor.

11. The method of claim 10, further comprising controlling the impedance of the power gate circuit at a beginning of execution of the machine instructions output from the translation cache using the instruction.

12. A system comprising:
a multicore processor including a plurality of cores to independently execute instructions, at least one power gate circuit coupled between a load line and the plurality of cores, and a controller to adjust an impedance of the at least one power gate circuit to a plurality of values between a maximum impedance and a minimum impedance responsive to execution of different groups of instructions in at least one of the plurality of cores, wherein the controller is to access a mapping table including a plurality of entries each to associate an instruction with a capacitance value, to determine a capacitance value for each of a plurality of instructions of a first instruction group, estimate a dynamic capacitance of a first core of the multicore processor in execution of the first instruction group based on the capacitance value for each of the plurality of instructions, calculate a control value for the at least one power gate circuit based on the dynamic capacitance estimate and adjust the impedance of the at least one power gate circuit based on the control value to absorb an over-voltage, wherein the control value is to control a width of the at least one power gate circuit;
a voltage regulator coupled to the multicore processor to provide a regulated voltage to the load line; and
a dynamic random access memory (DRAM) coupled to the multicore processor.

13. The system of claim 12, wherein the at least one power gate circuit is to increase the impedance of the at least one power gate circuit to absorb the over-voltage output by the voltage regulator in the at least one power gate circuit to reduce power consumption of the processor.

14. The system of claim 12, wherein the multicore processor further includes an engine to translate the first instruction group into a first machine instruction group and store the first machine instruction group in a translation cache, wherein the controller is to cause generation of an instruction to cause adjustment to the impedance of the power gate circuit.

* * * * *